United States Patent

[11] 3,584,218

[72] Inventor Kiichi Komatsubara
Tokorozawa-shi, Japan
[21] Appl. No. 852,064
[22] Filed Aug. 21, 1969
[45] Patented June 8, 1971
[73] Assignee Hitachi, Ltd.
Tokyo, Japan
[32] Priority Sept. 6, 1968
[33] Japan
[31] 43/63731

[54] INFRARED SPECTROMETER USING INTEGRATED MOS STRUCTURE
13 Claims, 4 Drawing Figs.

[52] U.S. Cl. .......... 250/83.3, 73/355, 317/235, 356/74
[51] Int. Cl. .......... G01j 3/38
[50] Field of Search .......... 250/83.3 H, 83.3 HP, 83 R; 317/235, 21.1, 27, 235 X; 356/74, 83; 73/355

[56] References Cited
UNITED STATES PATENTS
3,453,887 7/1969 Wooten .......... 317/234

*Primary Examiner*—James W. Lawrence
*Assistant Examiner*—Morton J. Frome
*Attorney*—Craig, Antonelli, Stewart and Hill

ABSTRACT: A solid state spectrometer utilizing the photoelectric conversion phenomena in the inversion layers of MOS elements, in which a crystal wafer containing a large number of MOS elements is cooled to low temperatures and different gate voltages are applied to the respective elements so that the elements exhibit sharp and mutually different absorption edges for incident infrared rays. The difference between the channel currents flowing in each pair of elements having adjacent absorption edges is derived and a large number of such channel current differences and the corresponding gate voltages are simultaneously scanned and applied to an oscilloscope, whereby the infrared intensity distribution of the incident infrared rays is shown on the face of a cathode-ray tube.

INVENTOR
KIICHI KOMATSUBARA
BY Craig, Antonelli, Stewart & Hill
ATTORNEYS

PATENTED JUN 8 1971 3,584,218

INVENTOR

KIICHI KOMATSUBARA

BY Craig, Antonelli, Stewart & Hill

ATTORNEYS

INFRARED SPECTROMETER USING INTEGRATED MOS STRUCTURE

The present invention relates to a device for spectrally detecting infrared rays by utilizing the photoelectric conversion property of an MOS element, and more particularly to an infrared spectrometer capable of high speed scanning.

In order to spectrally analyze infrared rays at a high speed over a wide range of wavelengths, a scanning type infrared spectrometer in which a prism or grating is rotated has heretofore been used. In a device in which such a dispersion element is mechanically vibrated, the scanning speed cannot be made so high, and therefore is limited to at most several tens of Hz. or less.

A device which utilizes an interband electronic transition in a semiconductor due to infrared illumination is also known. This device is such one, for example, that spectrally detects infrared rays by applying a high hydrostatic pressure to a semiconductor to vary the infrared absorption edge in accordance with the pressure applied. In such a device, high speed scanning is of course difficult. As described above, according to conventional technology it has been impossible to follow and spectrally detect a rapid variation in the intensity distribution of infrared rays.

In the copending U.S. Pat. application Ser. No. 800,068, the applicant has disclosed a novel photoelectric conversion device, i.e. infrared spectrometer utilizing the dependency of quantized energy levels formed in the inversion layer of an MOS structure element on the gate voltage. This spectrometer utilizes the fact that the absorption edge wavelength of infrared absorption due to the resonance electronic transition between the above-mentioned energy levels varies with the gate voltage, and scans the gate voltage and at the same time differentiates the channel current synchronously with the scanning, whereby a wide range of infrared rays can be spectrally analyzed at a scanning speed of several hundreds of kHz.

However, this spectrometer is limited to several hundreds of kHz. in its scanning rate because it scans the gate voltage applied to an element having a considerable capacity.

Further, the spectrometer is apt to show a hysteresis at a high scanning rate because the scanning of the gate voltage is accompanied by a variation in the quantity of carriers accumulated in the inversion layer, and the carriers trapped in the surface levels at the time of the migration of the carriers accumulated in the inversion layer have a relatively large relaxation time.

It is, therefore, an object of the present invention to provide a spectrometer capable of spectrally detecting infrared rays having a wide range of wavelength components at a high scanning rate of several mHz.

Another object of the present invention is to provide a spectrometer comprising a simple spectral element and having the above-mentioned function.

A further object of the present invention is to provide a spectrometer having the above-mentioned function yet which is easy to manufacture and handle and inexpensive.

According to the present invention there is provided an infrared spectrometer comprising at least one element plate having a large number of MOS structure elements integrated thereon, means for cooling said element plate to such a low temperature that said elements have sharp infrared absorption edges due to the resonance electronic transition between quantized energy levels formed in the inversion layers of said elements, means for directing infrared rays to said element plate to cause the photoelectric conversion between said infrared rays and the channel currents of said elements through said resonance electronic transition, and an electric circuit coupled with said element plate including means for assigning and applying a plurality of gate voltages to said elements to divide said elements into a plurality of groups having different infrared absorption edge wavelengths, means for correcting a signal derived from the channel current of the element belonging to each group to compensate for the variation in the photoelectric conversion with the gate voltage, means for deriving a difference signal from said signals of two groups having adjacent absorption edge wavelengths to obtain a signal corresponding to the infrared intensity in the range between said adjacent absorption edge wavelengths, switching means for applying said difference signals and said gate voltages to an oscilloscope serially and repeatedly, whereby the intensity distribution of said infrared rays is displayed on the face of a cathode-ray tube.

When a high voltage is applied to an MOS element of the structure that one surface of a P-type semiconductor body is coated with a metal layer through an interposed insulating layer in such a manner that the metal layer is positive and the semiconductor body is negative, a large number of electrons accumulate at the surface to form a so-called inversion layer. The thickness of the inversion layer is very small, of the order of the de Broglie wavelength of an electron, and a steep potential gradient is present therein. For this reason, the energy levels of an electron in the inversion layer are quantized in a direction towards the interior of the semiconductor body.

Since the number of accumulated electrons varies depending on the gate voltage, also the potential gradient in the inversion layer varies depending on the gate voltage. Consequently, the above-mentioned quantized energy levels vary with the gate voltage since these quantized energy levels depend on the potential gradient.

When an MOS element is cooled to a low temperature such as that of liquid helium, the quantized energy levels become sharp, with narrow line widths to form a group of clearly discrete energy levels $E_0$, $E_1$, $E_2$, ..... corresponding to an applied gate voltage.

According to experiments made by the inventor, when infrared rays are directed to an inversion layer having such a group of energy levels, electrons in the ground level $E_0$ are excited to an upper level $E_1$ by infrared photons having an energy larger than the energy difference $E_1-E_0$, accompanied by a clear change in a channel current flowing through the inversion layer.

It has also been observed that the wavelength of the infrared absorption edge corresponding to the energy difference $E_1-E_0$ clearly varies depending on the gate voltage.

The present invention utilizes the above-described phenomena, and provides a spectrometer in which infrared rays are simultaneously directed to a number of MOS element to which gate voltages different from each other are applied so that they have different absorption edge wavelengths, and the difference between the channel currents at each pair of MOS elements having absorption edge wavelengths slightly different from each other is successively detected to obtain an intensity distribution of the incident infrared rays.

Features and advantages of the present invention will become more apparent from the following detailed description of some preferred embodiments of the invention made with reference to the accompanying drawings, in which.

Throughout the figures, similar parts are designated by similar reference numerals or symbols.

Now, an embodiment employing an element plate consisting of a P-type InSb crystal wafer on which a number of MOS elements are integrated will be described in detail.

Figures 1, 2:
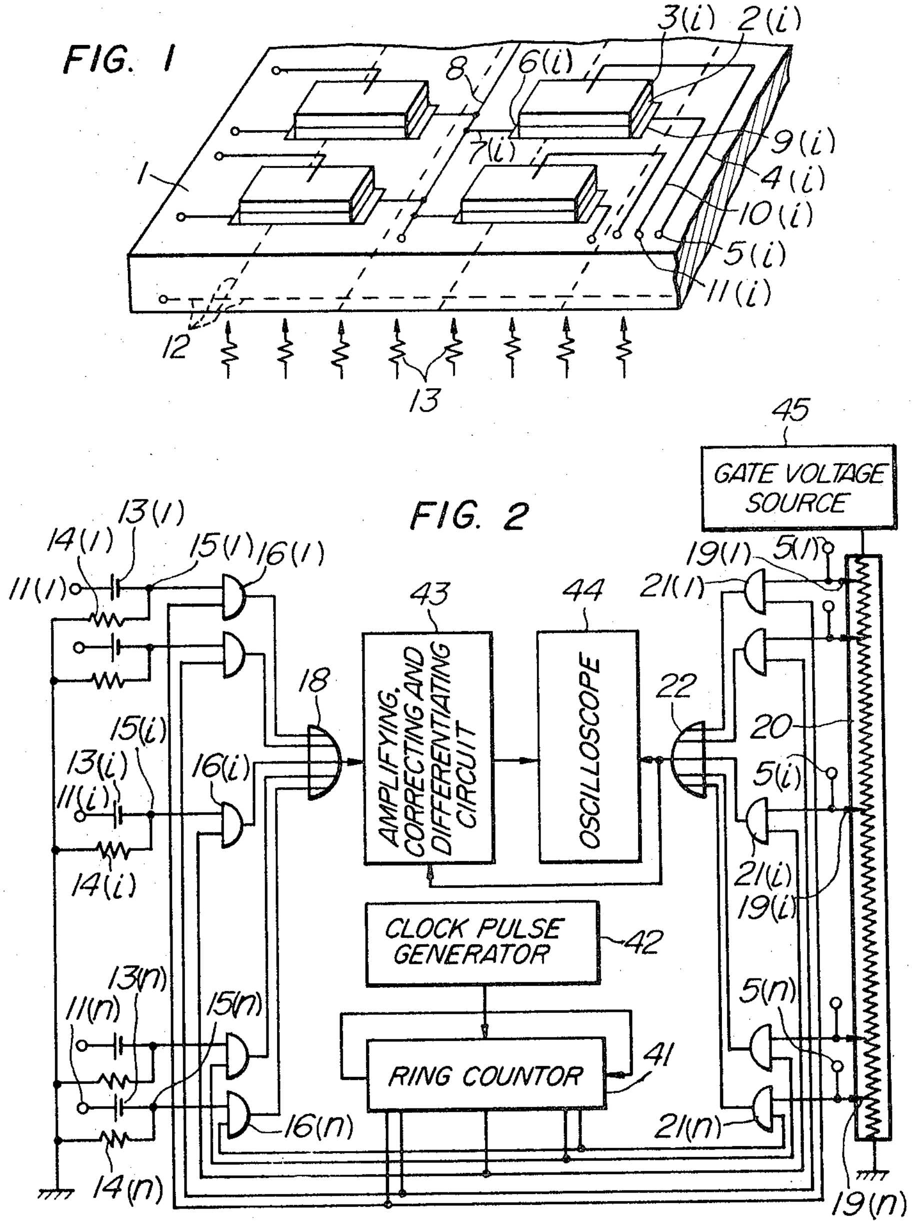
FIG. 1 is a perspective view of the structure of elements employed in an embodiment of the invention.
FIG. 2 is a circuit diagram of an electric circuit employed in the embodiment of FIG. 1.

Referring to FIG. 1 which is a perspective view of a part of an element plate, the element plate comprises *n* MOS elements formed by a mask and photoresist technique or the like. Hereinafter the MOS elements are represented by the *i*th element designated by reference *i*. An aluminum layer 3(*i*) provided on a crystal wafer 1 through an insulating layer 2(*i*), for example a silicon dioxide layer, serves as a gate electrode of the *i*th element. A lead wire 4(*i*) on the wafer 1 connects the gate electrode 3(*i*) with a terminal 5(*i*). By a well-known technique a source electrode 6(*i*) and a drain electrode 9(*i*) are provided to the MOS element, the source electrode 6(*i*) and the drain electrode 9(*i*) being connected with a common lead 8 and a terminal 11(*i*) through lead wires 7(*i*) and 10(*i*), respectively.

Other common leads 12 are provided on the opposite surface of the crystal wafer 1. Incident infrared rays are designated by numeral 13.

Examples of the circuit to be connected with the element plate and the principle of operation of the invention will next be described.

FIG. 2 shows an electrical circuit in which the gate voltages applied to the elements and the channel currents flowing through the elements are synchronously and successively derived with predetermined time intervals, and the difference between the channel currents of the elements is applied, together with the gate voltages, to the terminals of an oscilloscope.

The terminal 11(*i*) on the element plate, which is connected with the drain electrode 9(*i*) as has been described above, is connected in series with a source-drain power supply 13(*i*) and a load resistance 14(*i*), the junction point 15(*i*) between which is connected with an AND gate 16(*i*). AND gates 16(1), ....., 16(*i*), ....., 16(*n*) are successively and repeatedly rendered to be conductive by gate pulses from a ring counter 41 which is actuated by clock pulses from a clock pulse generator 42.

The outputs of the AND gates 16(1), ....., 16(*n*) are connected through an OR gate 18 with an amplifying, correcting and differentiating circuit 43.

Since the AND gates 16(1), ....., 16(*n*) are successively made conductive by the gate pulses as described above, the channel currents of the elements are also successively applied to the amplifying, correcting and differentiating circuit 43, and this operation is periodically repeated.

As will be described later in detail, successively slightly different gate voltages are applied to the elements. Such difference between gate voltages gives rise to the difference between the absorption edges of the elements as well as the difference between the photosensitivities of the elements which convert infrared rays into channel currents and the difference between bias currents, i.e. dark currents which are currents flowing in the absence of incident light.

Consequently, in order to exactly correspond the channel currents to the incident infrared rays, the channel current of each element should be corrected so that the influence due to the variations in the photosensitivity and bias current is eliminated. This correction is effected in the following manner.

The bias current corresponding to the gate voltage is substrated from the channel current, and the remainder is divided by the photosensitivity corresponding to the gate voltage. (Since a circuit carrying out this operation is disclosed in the aforementioned copending application, a description of such a circuit is not repeated here.) The thus corrected channel current corresponds to an integral of components of incident infrared rays within the wavelength range shorter than the absorption edge.

Consequently, the difference between the corrected channel currents of two elements having adjacent absorption edges corresponds to the intensity of the infrared rays within the wavelength range between the two absorption edge wavelengths. Such differences successively obtained provided the intensity distribution of incident infrared rays.

When a large number of elements are provided on the element plate and the same number of absorption edge wavelengths can be utilized, the above-mentioned operation of successively obtaining differences can be replaced by the differentiation of the swept channel currents with respect to the absorption edge wavelength, i.e. the gate voltage.

The amplifying, correcting and differentiating circuit 43 in FIG. 2 is the circuit carrying out the above operation. The circuit 43 is connected in such a manner that it synchronizes with the gate voltage as is shown in FIG. 2. The output of the circuit 43 is connected with the signal terminal of an oscilloscope 44, and signals corresponding to the intensity distribution of incident infrared rays are successively and periodically supplied to the signal terminal.

As has been described above, the gate voltage corresponds to the absorption edge wavelength equivalent to the difference between the energy levels $E_1-E_0$, but their relation is not linear.

In FIG. 2, a potentiometer 20 having multiterminals 19(1), ....., 19(*i*), ....., 19(*n*) is connected with a gate voltage source 45, each of the terminals being adjusted such that the absorption edge wavelength of each element shifts by the same wavelength difference. The terminal 19(*i*) is connected with the terminal 5(*i*) on the element plate for applying a gate voltage to the *i*th element and with an AND gate 21(*i*). AND gates 21(1), ....., 21(*n*) are connected with the ring counter 41 so that the same gate pulse as that applied to the AND gate 16(*i*) is applied to the AND gate 21(*i*). In other words, the AND gates 16(*i*) and 21(*i*) simultaneously become conductive.

The outputs of the AND gates 21(1), ....., 21(*n*) are connected through an OR gate 22 with the amplifying, correcting and differentiating circuit 43 and the sweep terminal of the oscilloscope 44. By such connection, the channel current and gate voltage of the same element are simultaneously applied to the differentiating circuit 43, and the aforementioned differentiating operation is performed. Also by such connection, a series of gate voltages corresponding to a series of absorption edge wavelengths having the same wavelength difference are successively and periodically applied to the sweep terminal of the oscilloscope 44, while signals corresponding to the infrared intensities in the vicinity of the absorption edge wavelengths are successively and periodically applied to the signal terminal of the oscilloscope 44. Thus, an infrared intensity distribution for wavelengths is exactly depicted on the face of the cathode-ray tube of the oscilloscope 44.

Another circuit arrangement employed in the present invention will next be described with reference to FIG. 3.

The photosensitivity of an element varies not only depending on the gate voltage, but also depending on the source-drain voltage. Consequently, the difference between the photosensitivities of elements to which different gate voltages are applied can be compensated for by adjusting the source-drain voltages applied to the elements. When the elements are set by this adjustment so that they have the same photosensitivity $G$, the channel current $Isd(i)$ of the *i*th element is represented by $$Isd(i)=G\int_{\lambda\min}^{\lambda(i)}f(\lambda)d\lambda+[Id+\beta\{\lambda(i)-\lambda_{\min}\}],$$

where $f(\lambda)$ and $\lambda\min$ are the intensity distribution of incident infrared rays and the minimum wavelength, respectively, $\lambda(i)$ is the absorption edge wavelength, $\beta$ is a coefficient representing the dependency of the bias current on the absorption edge wavelength, and $Id+\beta\{\lambda(i)-\lambda\min\}$ is the bias current of the *i*th element, assuming that the relationship between the bias current and the absorption edge wavelength is linear. Therefore, the difference between the channel currents of the *i*th and the $(i+1)$th elements is represented by $$Isd(i+1)-Isd(i)=G\int_{\lambda(i)}^{\lambda(i+1)}f(\lambda)d\lambda +\beta\{\lambda(i+1)-\lambda(i)\}\fallingdotseq Gf(\lambda i)\Delta\lambda+\beta\Delta\lambda,$$

where $$\Delta\lambda=\lambda_{(i+1)}-\lambda(i).$$

That is, the difference between two channel currents is equal to the infrared intensity of wavelength components in the vicinity of the absorption edge wavelength of the *i*th element multiplied by a constant and a certain bias term added thereto. Therefore, if the differences between the channel currents of two elements having adjacent absorption edges are successively obtained, the intensities of wavelength components of incident infrared rays can be successively obtained.

Figure 3:
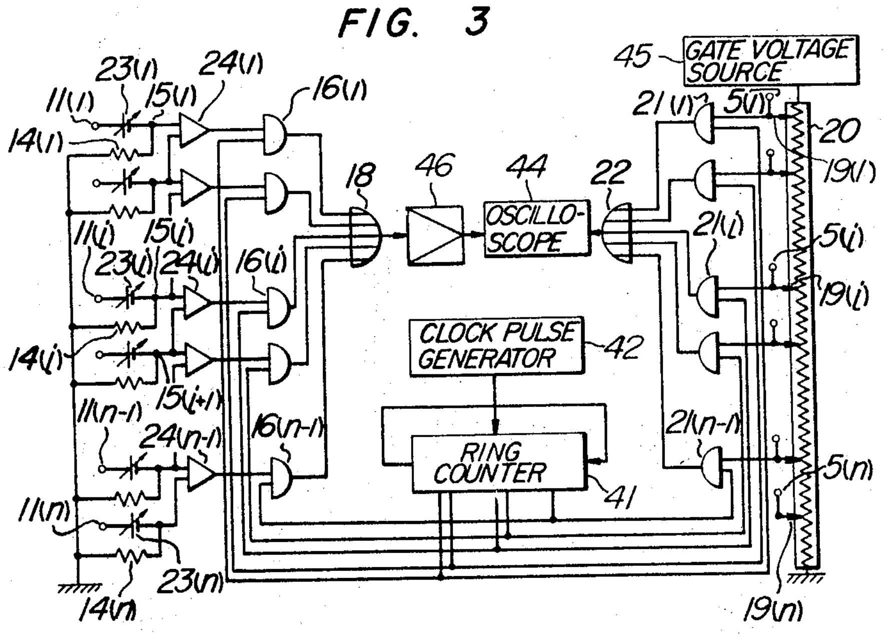
FIG. 3 is a circuit diagram of another electric circuit employed in the embodiment of FIG. 1.

FIG. 3 shows a circuit which performs this operation. The terminal 11($i$) on the element plate is connected in series with a variable source-drain power supply 23($i$) and the load resistance 14($i$). Variable source-drain power supplies 23(1), ....., 23($i$), ....., 23($n$) are adjusted such that all of the MOS element have the same photosensitivity. The junction point 15($i$) is connected with one input terminal of a subtractor 24($i$), and the junction point 15($i$+1) for the ($i$+1)th element is connected with the other input terminal of the subtractor 24($i$). Consequently, the difference between the channel currents of the $i$th and ($i$+1)th elements is derived from the output of the subtractor 24($i$). The output of the subtractor 24($i$) is connected with the AND gate 16($i$) which is coupled with a pulse circuit similar to that shown in FIG. 2. The AND gates 16(1), ....., 16($i$), ....., 16($n$) successively and periodically become conductive as in the circuit of FIG. 2. The outputs of the AND gates 16(1), ....., 16($n$) are connected through the OR gate 18 and an amplifier 46 with the signal terminal of the oscilloscope 44.

By such a connection, gate pulses from the ring counter 41 which is shifted by the pulses from the clock pulse generator 42 successively and periodically supply the differences between the channel currents of a pair of MOS elements having adjacent absorption edges to the signal terminal of the oscilloscope 44. To the sweep terminal of the oscilloscope 44 are successively and periodically applied gate voltages from a gate voltage circuit similar to that shown in FIG. 2. The pulse circuit is connected with the gate voltage circuit and the subtractors so that at the moment the gate voltage applied to a certain element is supplied to the sweep terminal of the oscilloscope, the difference between the channel currents of the element and the adjacent element is supplied to the signal terminal of the oscilloscope. Consequently, the intensity distribution of incident infrared rays is exactly displayed on the face of the cathode-ray tube of the oscilloscope.

In the above, electrical circuits which display the intensity distribution of incident infrared rays on the face of a cathode-ray tube are described. A circuit for continuously detecting and recording the intensity of a desired wavelength component only can be easily fabricated by modifying the circuit of FIG. 3 in such a manner that the pulse circuit comprising the AND gates 16($i$), ....., 16($n$−1) and 21(1), ....., 21($n$−1), the OR gates 18 and 22, the clock pulse generator 42 and the ring counter 41, and the oscilloscope 44 are eliminated, but instead a changeover switch is inserted between the outputs of the subtractors 24(1), ....., 24($n$−1) and the amplifier 46, and the output of the amplifier 46 is connected to a measuring and recording instrument.

Figure 4:
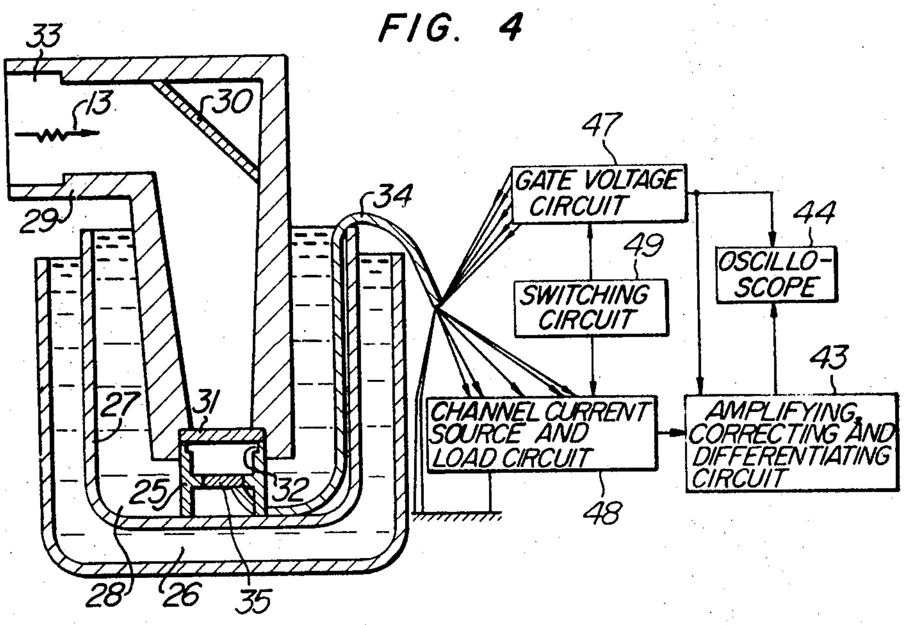
FIG. 4 is a cross-sectional view partly in block form of an embodiment of the invention.

FIG. 4 shows an embodiment of the present invention in cross section with a block diagram of an electrical circuit. An element plate 35 including MOS elements each comprising an insulating layer 2($i$), a gate electrode 3($i$), a source electrode 6($i$) and a drain electrode 9($i$), terminals 5($i$) and 11($i$), lead wires 4($i$), 7($i$), 8, 10($i$) and 12 is supported by a holder 25, and immersed in liquid helium 28 contained in a Dewar vessel 27 which is shielded by liquid nitrogen 26 from ambient temperature. With the holder 25 is coupled a light guide 29 which comprises a reflector 30 and a light filter 31 and directs incident infrared rays 13 to the element plate 35. The reflector 30 deflects the optical path of the incident light, and the filter 31 cuts off the shorter wavelength components than the aforementioned λmin. Further, in order to spectrally measure the infrared absorption of a specimen which is maintained at low temperatures or any temperature, specimen holding means 32 and 33 are provided to the holder 25 and the light guide 29, respectively.

The element plate 35 is electrically connected with a bundle 34 of lead wires through which the common leads 8 and 12 of the element plate 35 are grounded outside the cryostat. The group of terminals 5($i$) and the group of the terminals 11($i$) are connected with a gate voltage circuit 47 and a channel current source and load circuit 48, respectively.

As has been described so far, and as is easily understood from the figures, a signal voltage from the channel current source and load circuit 48 is supplied to an amplifying, correcting and differentiating circuit 43 synchronously with the corresponding gate voltage by the action of a switching circuit 49, the output of the amplifying, correcting and differentiating circuit 43 being supplied to the signal terminal of an oscilloscope 44, while the gate voltages are supplied to the sweep terminal of the oscilloscope 44. In this manner, the intensity distribution of incident infrared rays is displayed on the face of a cathode-ray tube.

As is evident from the preferred embodiments of the invention described so far, the present invention provides a spectrometer in which infrared rays are directed to the inversion layers of a large number of integrated MOS elements to which gate voltages are applied so that infrared absorption edges due to electronic resonance transition in inversion layers are different from each other, and the channel currents of the elements provide the intensity distribution of infrared rays by the help of an electric circuit.

The infrared spectrometer comprising one MOS element disclosed in the aforementioned copending application in which infrared rays are directed to the element, the gate voltage applied to which is directly swept, is limited in its scanning speed to several hundreds of kHz. or less because of the fact that the element has a considerable electrostatic capacity and the fact that the photoelectric conversion exhibits a hysteresis due to the relaxation time of the electrons trapped in the surface levels.

In the present invention, however, since fixed gate voltages are applied to MOS elements and the channel currents of the elements are successively derived, the entire wavelength range of incident infrared rays is scanned at such a high frequency as several mHz. Consequently, infrared rays emitted by an instantaneous phenomenon such as an explosion can be easily followed and analyzed.

In the above-described embodiments, gate voltage so adjusted that the absorption edge wavelengths of elements are arranged with equal wavelength differences are applied to the elements to provide the intensity distribution of infrared rays with respect to the wavelength. However, the terminals 19($i$) of the potentiometer 20 can be easily adjusted so that the wave numbers, which are inverse to the absorption edge wavelengths, are arranged at equal intervals. By this adjustment the intensity distribution of infrared rays with respect to the wave number can be directly displayed on the face of a cathode-ray tube. That is, according to the present invention, various kinds of intensity distributions of infrared rays can be directly displayed.

Furthermore, according to the present invention, since the element plate is cooled to low temperatures, the quantized energy levels formed in the inversion layers of the elements have narrow line widths as well as a narrow level difference $E_1-E_0$. As a result, each element has a sharp absorption edge.

At present, several thousands to several tens of thousands of MOS elements per square centimeter can be easily integrated on an element plate by the IC technology. Therefore, by setting a large number of MOS elements integrated on a small element plate so that their absorption edge wavelengths are successively slightly different from each other, a high resolution can be attained. Such a small element plate as having a sufficient resolution over a wide range of wavelengths has the advantage that it enables the spectrometry of a fine beam of infrared rays and a spectral detection of the infrared absorption by a micro region of a specimen or a micro specimen.

Since the element plate includes a large number of elements, a connection can be made such that each gate voltage is applied to a plurality of elements to thereby raise the photosensitivity and the detection limit. In such a connection, if the said plurality of elements are appropriately selected on the element plate, the illumination distribution of incident light on the element plate can be compensated for. Moreover, since the semiconductor material of the element plate is usually substantially transparent to infrared rays, it is easy to construct such that infrared rays are directed to a plurality of stacked element plates to thereby raise the photosensitivity and detection limit to infrared rays. In addition to the abovementioned features and advantages of the present invention, the integrated MOS element plate employed in the present invention is easy to manufacture, easier to handle and less troublesome and inexpensive than the conventional dispersion element such as a grating.

What I claim is:

1. An infrared spectrometer comprising:

at least one element plate having a large number of MOS structure elements integrated thereon;

means for cooling said element plate to such a low temperature that said elements have sharp infrared absorption edges due to the resonance electronic transition between quantized energy levels formed in the inversion layers of said elements;

means for directing infrared rays to said element plate to cause the photoelectric conversion between said infrared rays and the channel currents of said elements through said resonance electronic transition; and an electric circuit coupled with said element plate including means for assigning and applying a plurality of gate voltages to said elements to divide said elements into a plurality of groups having different infrared absorption edge wavelengths, means for correcting a signal derived from the channel current of the element belonging to each group to compensate for the variation in the photoelectric conversion with the gate voltage, means for deriving a difference signal from said signals of two groups having adjacent absorption edge wavelengths to obtain a signal corresponding to an infrared intensity in the range between said adjacent absorption edge wavelengths, switching means for applying said difference signals and said gate voltages to an oscilloscope serially and repeatedly, whereby the intensity distribution of said infrared rays is displayed on the face of a cathode-ray tube.

2. An infrared spectrometer according to claim 1, wherein a plurality of said element plates are laminated to transmit said infrared rays therethrough.

3. An infrared spectrometer according to claim 1, wherein each of said plurality of gate voltages is assigned and applied to a plurality of elements to enhance the photosensitivity and detection limit.

4. An infrared spectrometer according to claim 3, wherein said plurality of elements to which the same gate voltage is applied are arranged in correspondence with the luminous distribution on said element plate of said infrared rays.

5. An infrared spectrometer according to claim 1, wherein said plurality of gate voltages are so set as to assign a series of absorption edge wavelengths with equal wavelength differences to said groups, whereby an infrared spectrum for the wavelength is directly obtained.

6. An infrared spectrometer according to claim 1, wherein said plurality of different gate voltages are so set as to assign a series of absorption edge wavelengths with equal wave number differences to said groups, whereby the infrared spectrum for the wave number is directly obtained.

7. An infrared spectrometer according to claim 1, wherein said means for deriving a difference signal comprises a differentiating circuit for differentiating a series of said corrected signals with respect to the corresponding gate voltages.

8. An infrared spectrometer according to claim 1, wherein said electric circuit comprises a plurality of variable source-drain power supplies for correcting said variation in the photoelectric conversion with the gate voltage by adjusting the source-drain voltages applied to respective elements.

9. An infrared spectrometer according to claim 8, wherein said means for deriving a difference signals comprises a plurality of subtractors each coupled with said signals from two groups having adjacent absorption edge wavelengths.

10. An infrared spectrometer according to claim 1, wherein said switching circuit comprises a plurality of gate elements coupled with a gate pulse generator, whereby a high speed scanning is obtained.

11. An infrared spectrometer according to claim 1, wherein said element plate is made of P-type InSb.

12. An infrared spectrometer according to claim 1, wherein said means for directing infrared rays to said element plate is equipped with sample holding means to cause said rays to be transmitted through a sample, whereby the infrared absorption by said sample is spectrally measured.

13. An infrared spectrometer comprising:

at least one element plate having a large number of MOS structure elements integrated thereon;

means for cooling said element plate to such a low temperature that said elements have sharp infrared absorption edges due to the resonance electronic transition between quantized energy levels formed in the inversion of said elements;

means for directing infrared rays to said element plate to cause the photoelectric conversion between said rays and the channel currents of said resonance electronic transition; and electric circuit coupled with said element plate including means for assigning and applying a plurality of gate voltages to said elements to divide said elements into a plurality of groups having different infrared absorption edge wavelengths, means for correcting a signal derived from the channel current of the element belonging to each group to compensate for the variation in the photoelectric conversion with gate voltage, means for deriving a difference signal from said signals of two groups having adjacent absorption edge wavelengths to obtain a signal corresponding to the infrared intensity in the range between said adjacent absorption edge wavelengths, a switching means for selectively deriving said difference signal, means for detecting and recording said selected difference signal, whereby the infrared intensity in a given wavelength range is continuously measured.